July 13, 1965
A. V. WEASLER
3,194,615
SHAFT ORGANIZATION
Filed July 3, 1962
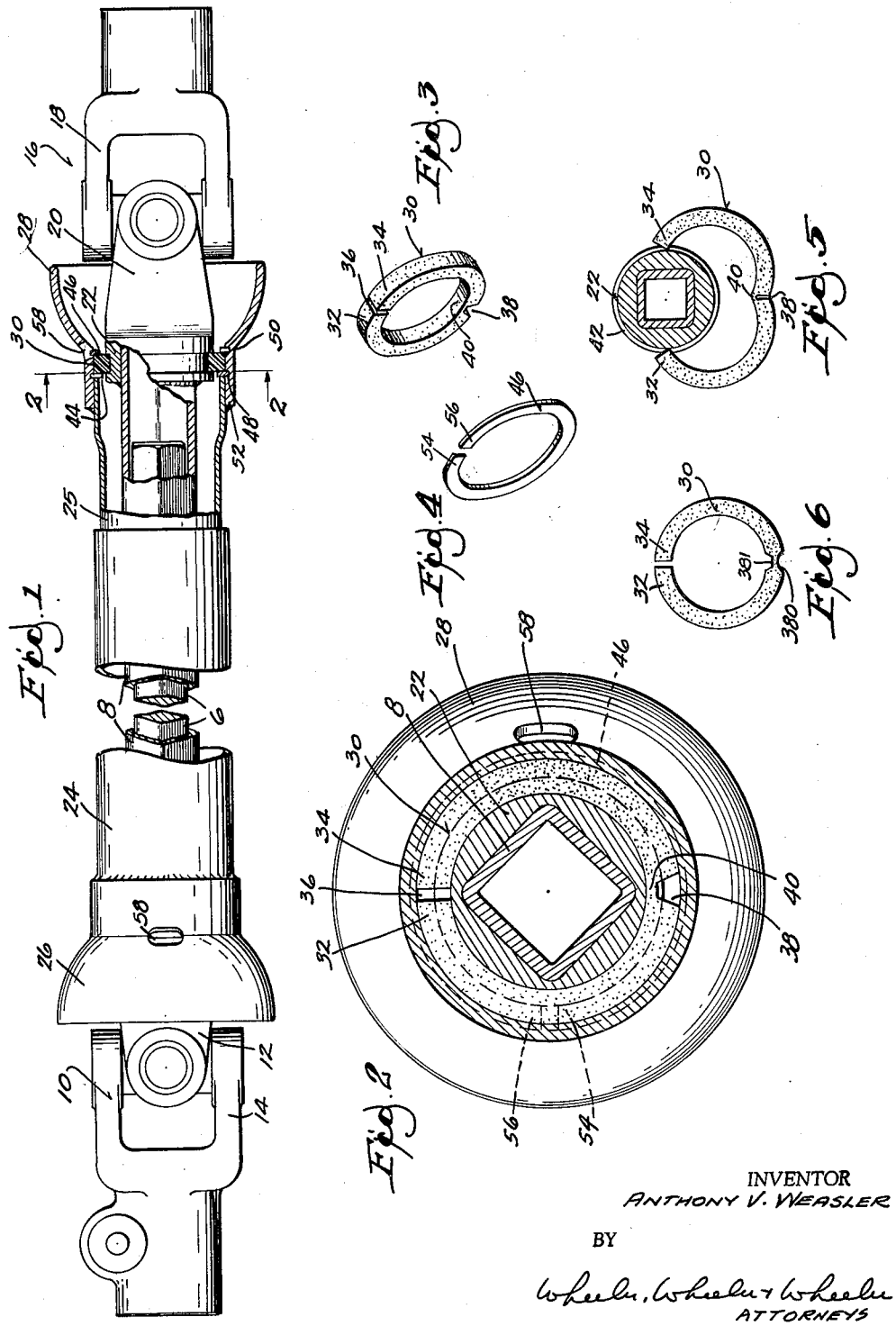
INVENTOR
ANTHONY V. WEASLER
BY
Wheeler, Wheeler + Wheeler
ATTORNEYS

United States Patent Office 3,194,615
Patented July 13, 1965

3,194,615
SHAFT ORGANIZATION
Anthony V. Weasler, 603 Ridge Road, West Bend, Wis.
Filed July 3, 1962, Ser. No. 207,231
1 Claim. (Cl. 308—37)

This invention relates to a quickly releasable tube mounting. It will be described with reference to a guard tube installation.

Telescopically extensible and universally jointed shafts have quite commonly been provided with guard tubes which may rotate with the shaft but which have bearings within which the shaft may rotate independently if a user comes in contact with the guard tube and arrests its rotation. Because of the physical characteristics of such a shaft, the guard tube bearing arrangements tend to be objectionably noisy. In the instant device, the noise problem is solved by the provision of non-metallic bearing elements preferably made of low-friction resin such as nylon or Teflon.

An outstanding feature of the invention consists in the possibility of installing a given section of an outer or guard tube on an inner supporting member such as a universal joint, or removing it from the assembly, in a matter of a few seconds. This involves a special type of bearing and a special type of connecting means. The bearing and connecting means are preferably used together, although each includes a novel feature which is usable independently of the other. As used, the bearing is a flexible non-metallic ring seated in opposing channels of inner and outer members. The ring is preferably a split ring whereby it is readily expanded for application or removal with respect to the channel in which it is normally disposed. One of the channels comprises a retaining device which is a conventional snap washer in engagement with the split bearing ring and a portion thereof is preferably disposed adjacent an aperture in the outer member through which a tool may be inserted to flex the ring for its instant release.

The invention is also concerned with the manner in which the bearing elements are constructed and mounted. In the disclosed embodiment each such element is a nearly complete ring of substantial radial thickness. The ring may be in one piece or in a number of pieces. If the ring is in one piece, it desirably comprises a split ring to make it readily applicable to and removable from the peripherally channeled member with which it is engaged. In this case the ring is provided, at a point preferably diametrically opposite its split ends, with a notch in its outer periphery, the remaining inner peripheral portions of the ring being sufficiently flexible to serve as a hinge to permit the split ends to be separated to clear the inner of the two members between which the bearing ring is disposed. In practice, the inner member is peripherally channeled to receive the ring and the radial bearing surface is provided by the outer periphery of the ring.

The retaining means above referred to comprises as least one split ring washer cooperating with an opposing shoulder of some sort. In practice, I show a pair of snap ring washers releasably engaged in grooves in the outer member or guard tube, the grooves being spaced to embrace the opposite end surfaces of the ring, thus defining in the outer member a race similar to the race provided by the channel of the inner member. Engagement of the end faces of the resin ring with the shoulders of the races provides thrust bearing means for holding the parts against axial displacement.

The construction of the guard is broadly immaterial. However, for the purpose of exemplifying the invention I have illustrated a construction in which the outer member comprises a bell at the end of a section of the telescopic guard tube. The outer member desirably has an opening intersected by the groove of that snap ring which is nearest the end of the guard tube assembly. A screw driver or other tool can be inserted through this opening to be engaged with an intermediate portion of the snap ring to deflect it from its groove, whereby the guard tube assembly may be withdrawn from the shaft or vice versa. With the snap rings in place, the bearing ring not only provides a radial bearing but positions the guard tube assembly against displacement axially of the shaft. It is even possible to manipulate the snap ring by means of a tool inserted into the end of the outer member. Thus, the aperture is not an essential feature, although it is a very desirable one.

In the drawings:

FIG. 1 is a fragmentary view partially in side elevation and partially in axial section showing a guard tube and shaft organization incorporating a mounting made in accordance with this invention.

FIG. 2 is an enlarged detail view taken in cross section on the line 2—2 of FIG. 1.

FIGS. 3, 4 and 5 are on the scale of FIG. 1 in which FIG. 3 is a view in perspective of the bearing ring; FIG. 4 is a similar view of the snap ring in perspective; FIG. 5 is a detail view in cross section through the portion of the shaft assembly upon which the bearing ring is mounted, the free ends of the bearing ring being illustrated in spread position in the course of its application or dismounting.

FIG. 6 is a side elevation of a slightly modified bearing.

The shaft organization is of generally conventional form with the exception of bearing means for mounting the guard tube sections as hereinafter described. It is not desired to limit the invention to any particular type of shaft. The arrangement illustrated is for exemplification. As illustrated, there is a squared shaft 6 telescopic in a squared tubular shaft 8. The shaft section 6 is provided with a universal joint generically designated by reference character 10 and comprising a pair of integrally connected yokes 12 and 14. The squared tubular shaft section 8 is provided with a universal joint 16 comprising yokes 18 and 20.

Each of the universal joint yokes has a hub portion 22, which here constitutes the inner member upon which the outer guard to the member is mounted. In this instance, the guard tube comprises a tube member 24 supported from the hub portion of the yoke 12, and another guard tube member 25 supported from yoke 20. The supporting means is preferably as shown in section at the right hand end of FIG. 1. The guard tube members 24 and 25 have bells 26 and 28 at their respective ends. The hub portions of these bells constitute the outer members of the support structure to which this invention relates. The bearing supports for the guard tube members lie between the respective bell portions and the respective yoke hubs in the present exemplification of the invention. This, however, is not an essential feature.

The bearing element 30 desirably is made of synthetic resin of a type having low friction characteristics. "Nylon" and "Teflon" are appropriate materials, but there are others. The characteristic of the bearing element is such that it is readily receivable into and removable from the annular channel of one of the members aforesaid and projects from such channel to be engaged in a channel of the other member, at least one wall of which is provided by a split washer.

As is most clearly apparent in FIGS. 2, 3 and 5, the bearing element 30 preferably is a split ring having free ends 32 and 34 and provided at some point which is preferably about opposite the gap 36 between such ends with a notch 38. Notches 38 may be provided in either periphery, or in both, as shown at 380 and 381 in FIG. 6. The sides of the notch need not be straight but are divergent quite widely, as in FIG. 6. The minimum desirable flare is forty-five degrees as shown in FIG. 2, if the base of the notch is relatively flat. However, the notch may be made as shown at 380, FIG. 6, with its surfaces on a continuous arc. The precise form of the notch or notches is relatively unimportant but sufficient material should be removed so that the split ring can be flexed open to be engaged diametrically in a channel such as that hereinafter described.

The ring 30 is quite flexible and has substantial resilence tending to restore it to its form. However, in the preferred construction, it has substantial radial thickness in order that the end faces adjacent its inner and outer peripheries may seat against suitable shoulders of the inner and outer members between which the bearing element is disposed. This thickness of the ring reduces its flexibility except wherein the notch 38 or 380 is provided. At that point, the inner peripheral portion 40 of the ring is quite flexible so that the free ends 32 and 34 can be separated sufficiently to clear the inner member of the bearing structure 22 when the ring is applied or removed as shown in FIG. 5.

The shoulders of the inner member are provided by a channel 42 in the hub 22. At least one of the shoulders of the outer member is provided by a washer. In the embodiment illustrated I have shown both shoulders to be provided by snap washers 44 and 46 which, as best shown in FIG. 4, are split washers which are of substantial radial dimension but are thin axially. The washers are normally seated in the grooves 48 and 50 of the outer race member which here comprises the hub portion 52 of the bell 28. The spacing between the snap ring washers 44 and 46 is such that these washers rather closely embrace the end faces of the bearing ring in the manner clearly appearing in FIG. 1. In inserting the snap washer 46, care is desirably exercised in locating the free ends 54 and 56 so that these will be on the diametrically opposite side of the tube from an opening 58 provided in the bell. In consequence of this arrangement, it becomes an easy matter to spring the snap washer 46 from its groove 50 by inserting a screwdriver or other tool through the opening 58 and pushing on a portion of the washer 46 intermediate its free ends.

It will be observed that the annular bearing element 30 not only provides a radial bearing but a thrust bearing since its outer periphery supports the guard while its end surfaces are engaged with the shoulders provided respectively by the groove 42 of the inner member and by the snap washers 44 and 46 of the outer member. Because the bearing element is non-metallic, the annoying rattling of the guard tube on the shaft is almost entirely eliminated and the operation is nearly noiseless.

A jointed shaft has been selected to exemplify the invention because it has presented a particularly aggravated noise problem. However, there are features of the invention which are of general application, as indicated in the following claim.

I claim:

In a shaft organization which includes inner and outer members, non-metallic bearing means rotatably supporting and axially positioning the outer member from the inner member, said bearing means comprising a discontinuous ring having an arcuate extent materially in excess of 180° and provided with separable ends, the inner member having an annular channel in which a peripheral portion of the ring is releasably engaged and from which the other periphery of said ring projects, the outer member having adjacent one of its ends a complementary channel in which said other periphery of the discontinuous ring is disposed, the two channels of the respective members having shoulders engaging the ring, whereby said members are not only positioned radially but restrained from relative axial displacement, one of said shoulders proximate the said end of the outer member comprising a snap washer engaged in a narrow peripheral slot with which said outer member is provided, the snap washer having a free end and being removable from the slot for withdrawal from the said end of the outer member when the free end of the snap washer is deformed inwardly, the snap ring also being replaceable through the end of the outer member, the outer member having an opening communicating with said slot and through which a portion of said washer near at least one of its free ends is accessible for deforming it inwardly by radially inward pressure to release it from the slot whereby to permit the axial movement of the outer member from the bearing ring, and the said outer member being freely movable axially away from the bearing ring when the snap washer is absent.

References Cited by the Examiner

UNITED STATES PATENTS

| | | | |
|---|---|---|---|
| 2,532,327 | 12/50 | Parks | 308—174 X |
| 2,772,550 | 12/56 | Harrington | 64—4 |
| 2,796,749 | 6/57 | Warner | 64—4 |
| 2,857,214 | 10/58 | Kogstrom et al. | 308—71 |
| 2,911,803 | 11/59 | Weasler | 64—4 |
| 2,923,140 | 2/60 | Weasler | 64—4 |
| 2,995,405 | 8/61 | Ferdig. | |

ROBERT C. RIORDON, *Primary Examiner.*

RALPH H. BRAUNER, *Examiner.*